US012795391B2

(12) United States Patent
Anderson et al.

(10) Patent No.: US 12,795,391 B2
(45) Date of Patent: Nov. 10, 2026

(54) SOFTWARE-DEFINED ANTENNA MANAGEMENT FOR AN ACCESS POINT OF A WIRELESS LOCAL AREA NETWORK

(71) Applicant: Cisco Technology, Inc., San Jose, CA (US)

(72) Inventors: Fred J. Anderson, Pt. Charlotte, FL (US); John Matthew Swartz, Lithia, FL (US); Sudhir K. Jain, Hayward, CA (US); Indermeet Singh Gandhi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 270 days.

(21) Appl. No.: 18/597,249

(22) Filed: Mar. 6, 2024

(65) Prior Publication Data

US 2025/0287222 A1 Sep. 11, 2025

(51) Int. Cl.
*H04W 16/28* (2009.01)
*H04W 16/14* (2009.01)
(Continued)

(52) U.S. Cl.
CPC ........... *H04W 16/28* (2013.01); *H04W 16/14* (2013.01); *H04W 72/046* (2013.01);
(Continued)

(58) Field of Classification Search
CPC ... H04W 16/14; H04W 16/28; H04W 72/046; H04W 72/0473; H04W 72/20;
(Continued)

(56) References Cited

U.S. PATENT DOCUMENTS 11,224,044 B1 1/2022 Hu et al.
2014/0226453 A1 8/2014 Harel et al.
(Continued)

FOREIGN PATENT DOCUMENTS

WO 2020037207 A1 2/2020
WO 2022000409 A1 1/2022
WO WO-2025136160 A1 * 6/2025 ............. H04B 7/088

OTHER PUBLICATIONS

Cisco Public, "Wi-Fi 6E: The Next Great Chapter in Wi-Fi," White Paper, https://www.cisco.com/c/en/us/solutions/collateral/enterprise-networks/802-11ax-solution/nb-06-wi-fi-6e-wp-cte-en.html, Nov. 4, 2022, 10 pages.
(Continued)

*Primary Examiner* — Kevin C. Harper
(74) *Attorney, Agent, or Firm* — Edell, Shapiro & Finnan, LLC

(57) ABSTRACT

Provided herein are techniques to facilitate software-defined antenna management for a wireless access point of a wireless local area network. In one example, a method may include communicating, by a wireless access point of a wireless local area network to a management service, a request to operate a transmission beam to be produced by the wireless access point using a transmitter and a software-defined antenna of the wireless access point; and obtaining by the wireless access point from the management service, beam configuration information identifying parameters that the wireless access point is to utilize for operation of the transmission beam to be produced by the wireless access point using the transmitter and the software-defined antenna.

20 Claims, 7 Drawing Sheets

(51) Int. Cl.

| | |
|---|---|
| ***H04W 72/044*** | (2023.01) |
| ***H04W 72/21*** | (2023.01) |
| ***H04W 72/23*** | (2023.01) |
| *H04W 88/08* | (2009.01) |
| *H04W 88/12* | (2009.01) |

(52) U.S. Cl.
CPC ....... *H04W 72/0473* (2013.01); *H04W 72/21* (2023.01); *H04W 72/23* (2023.01); *H04W 88/08* (2013.01); *H04W 88/12* (2013.01)

(58) Field of Classification Search
CPC ... H04W 72/21; H04W 72/23; H04W 72/231; H04W 72/232; H04W 72/25; H04W 72/27; H04W 72/29; H04W 88/08; H04W 88/12
See application file for complete search history.

(56) References Cited

U.S. PATENT DOCUMENTS

| | | | | |
|---|---|---|---|---|
| 2023/0224059 | A1 | 7/2023 | Parkvall et al. | |
| 2023/0232242 | A1* | 7/2023 | Palayur ................. | H04W 24/02 455/454 |
| 2024/0032019 | A1* | 1/2024 | Singh .................... | H04W 16/04 |
| 2025/0183992 | A1* | 6/2025 | Peng ..................... | H04L 5/0048 |

OTHER PUBLICATIONS

FCC, "FCC 14-30, Federal Communications Commission, First Report and Order, In the Matter of Revision of Part 15 of the Commission's Rules to Permit Unlicensed National Information Infrastructure (U-NII) Devices in the 5 GHZ Band," https://docs.fcc.gov/public/attachments/FCC-14-30A1.pdf, Mar. 31, 2014, 59 pages.
Everythingrf, "What is Automated Frequency Coordination (AFC)?" retrieved from https://www.everythingrf.com/community/what-is-automated-frequency-coordination-or-afc, Feb. 18, 2024, 8 pages.

* cited by examiner

SOFTWARE-DEFINED ANTENNA MANAGEMENT FOR AN ACCESS POINT OF A WIRELESS LOCAL AREA NETWORK

TECHNICAL FIELD

The present disclosure relates to network equipment and services.

BACKGROUND

Networking architectures have grown increasingly complex in communications environments, particularly wireless networking environments. For wireless local area networks, the introduction of new frequency bands, such as the 6 Gigahertz (GHz) frequency band, presents new challenges and opportunities with regard to network management, including the management of wireless local area network access points.

In particular, outdoor wireless settings often include incumbent wireless transmit/receive devices, such as point-to-point microwave devices operating in certain Unlicensed National Information Infrastructure (U-NII) 6 GHz frequencies. Regulatory requirements stipulate that wireless local area network access points operating in the 6 GHz band are to limit interference to such incumbent devices operating in certain U-NII 6 GHz frequencies. Accordingly, challenges exist with regard to managing access points of wireless local area networks that operate in the 6 GHz band, particularly in outdoor wireless environments in which incumbent wireless devices are operating.

DETAILED DESCRIPTION

Overview

Figure 1A:
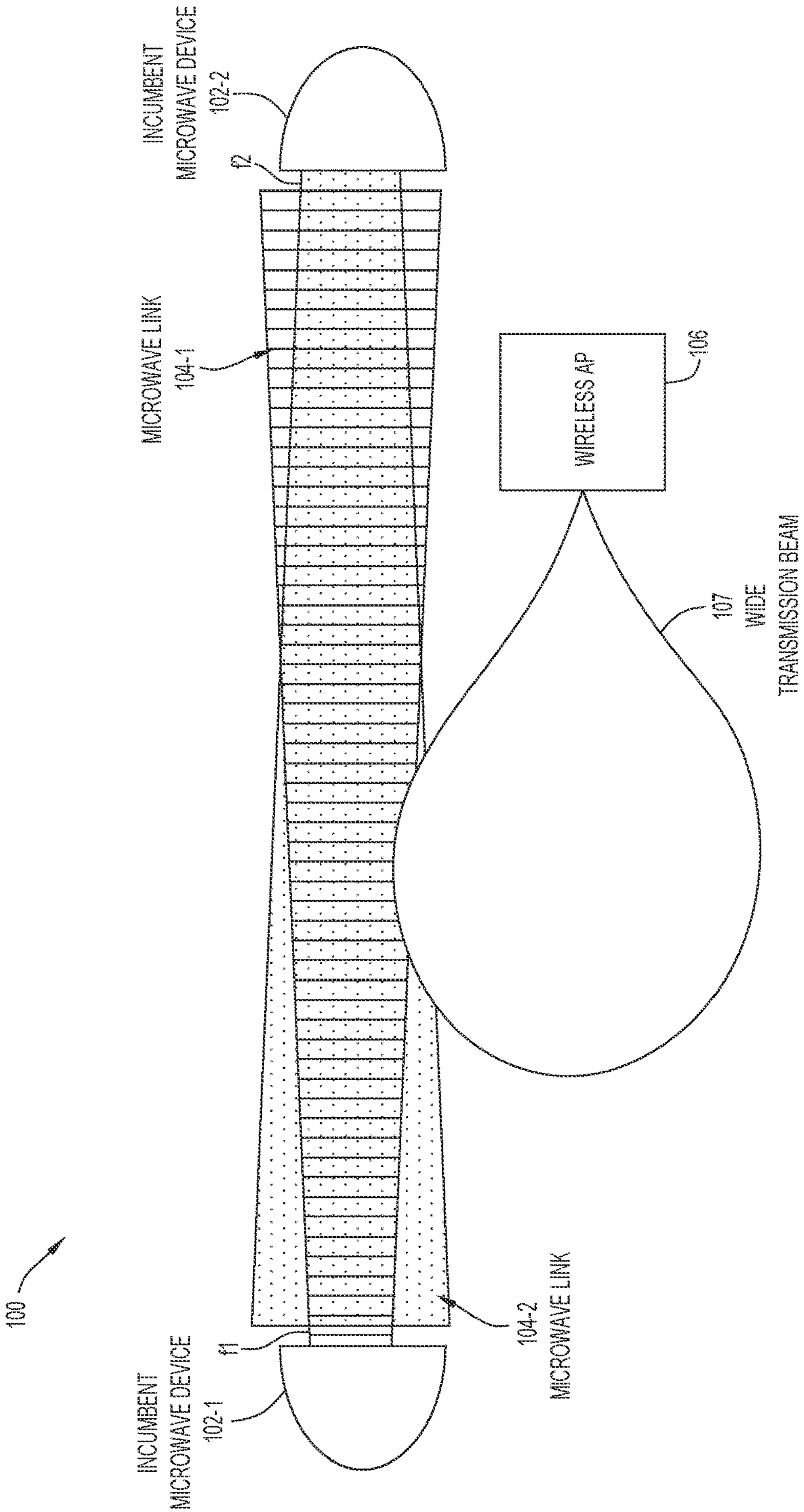
FIGS. 1A and 1B are diagrams illustrating example outdoor environments in which an access point of a wireless local area network may be operating in proximity to incumbent wireless devices operating in the 6 Gigahertz (GHz) band.

Innovations in wireless access points used in wireless local area networks (WLANs) have resulted in the development of directional antennas, also referred to herein as software-defined antennas. For a wireless access point (AP) configured with a software-defined antenna the transmission pattern or beam width for transmission beams transmitted or radiated via a transmitter and the software-defined antenna can be (automatically) switched between various configurations based on software or logic configured for the wireless AP. Such an innovation can be useful in many wireless environments, such as legacy wireless environments that may include APs having fixed-direction antennas.

A further innovation in wireless APs is utilization of the 6 Gigahertz (GHz) frequency band, which includes 5.925 GHZ-7.125 GHz frequencies, in which use of the 6 GHz band may facilitate increased throughput for wireless communications, among other improvements. Operation in the 6 GHz band also presents challenges, however, particularly in outdoor settings that can include incumbent wireless transmit/receive devices, such as point-to-point (p2p) microwave devices operating in certain U-NII 6 GHz frequencies.

Federal regulatory requirements stipulate that WLAN APs operating in the 6 GHz band are to limit interference to such incumbent devices operating in certain Unlicensed National Information Infrastructure (U-NII) 6 GHz bands/frequencies through power restrictions, such as Effective (or Equivalent) Isotropic Radiated Power (EIRP) restrictions, and orientation restrictions. For example, Federal Communication Commission (FCC) 14-30 Section 15.407 stipulates that for an outdoor wireless access point operating in the U-NII-1, U-NII-5, and U-NII-7 bands, "The maximum EIRP at any elevation angle above 30 degrees as measured from the horizon must not exceed 125 milliwatts (mW) (21 dBm)."

Current WLAN standards, such as Institute of Electrical and Electronics Engineers (IEEE) 802.11ax (Wi-Fi® 6/6E) and IEEE 802.be (Wi-Fi® 7) standards, do not include provisions that enable a wireless AP that is capable of software-defined antenna operation to communicate its beam capabilities (e.g., supported beam widths, supported orientations, and supported transmission power) to a control or management service (e.g., an automated frequency coordination (AFC) service, a wireless local area network (LAN) controller, or the like) to allow the control service to manage one or more beam configurations of the software-defined antenna of the AP, for example, in order to reduce or limit interference to incumbent wireless devices operating in the 6 GHz band in outdoor environments (e.g., parking lots, stadiums, arenas, fields, etc.).

Embodiments herein provide techniques through which a wireless AP can provide beam information (for a transmission beam that can be operated via a software-defined antenna of the AP) to a control or management service, such as an AFC service, and can obtain beam configuration from the control service that may indicate one or more parameters by which the wireless AP is to operate the transmission beam via the software-defined antenna. Such enhancements, which can be incorporated into Wi-Fi standards, may introduce elements through which to improve the functionality of antenna directionality in 6 GHz operating environments.

In at least one embodiment, a computer-implemented method is provided that may include communicating, by a wireless access point of a wireless local area network to a management service, a request to operate a transmission beam to be produced by the wireless access point using a transmitter and a software-defined antenna of the wireless access point; and obtaining by the wireless access point from the management service, beam configuration information identifying parameters that the wireless access point is to utilize for operation of the transmission beam to be produced by the wireless access point using the transmitter and the software-defined antenna.

Example Embodiments

In a WLAN, one or more wireless APs provide wireless Radio Frequency (RF) coverage over which one or more wireless devices (e.g., phones, wearable devices, tablets, etc.) can connect to the APs in order to connect to one or more data networks (e.g., the public Internet, an enterprise network operated by an enterprise entity (e.g., a business, institution, university, etc.)), and/or the like.

In outdoor environments in which incumbent wireless devices operating in the 6 GHZ band may be present, steering for software-defined antennas for access points may be needed to limit interference with such incumbent devices, per FCC regulations.

Figure 1B:
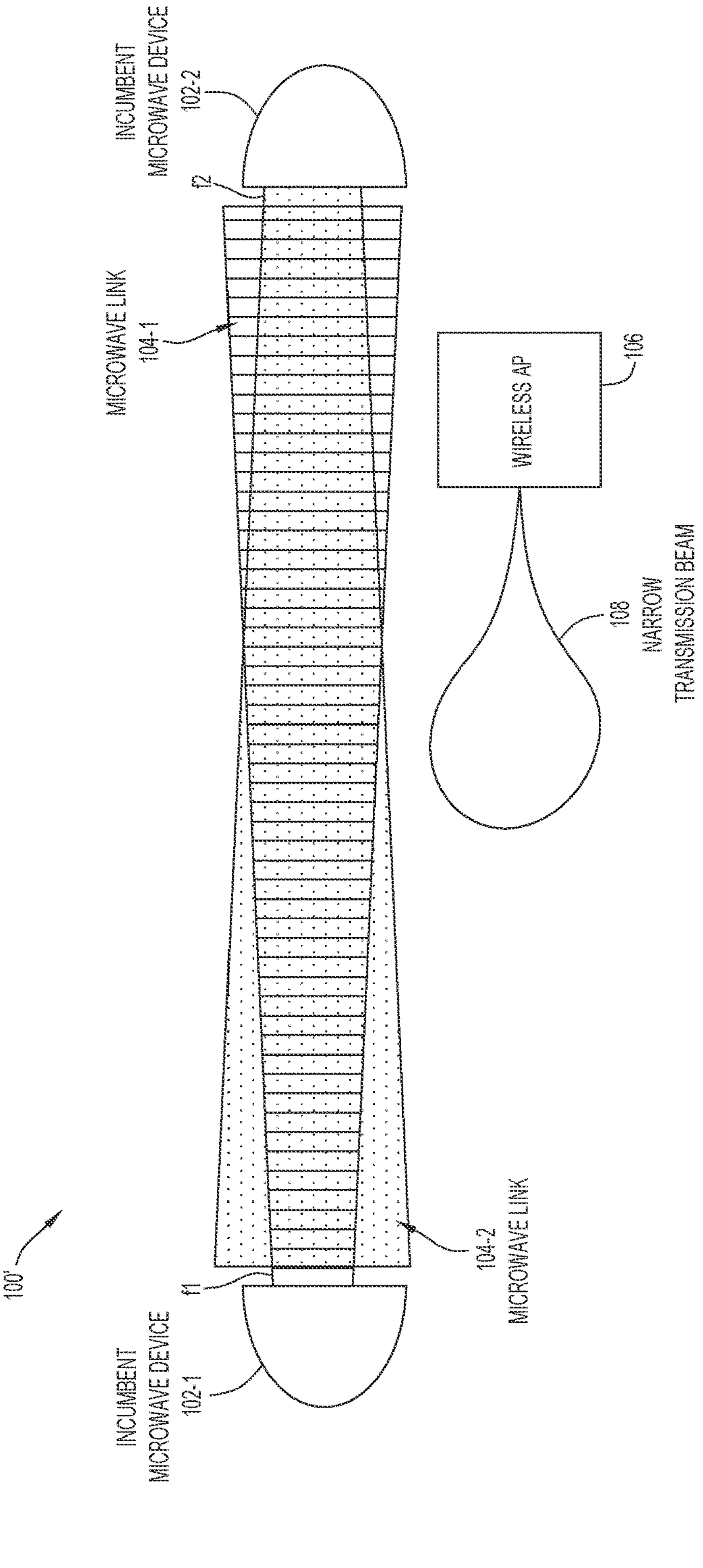

For example, consider FIGS. 1A and 1B, which illustrates example outdoor environments 100 (FIG. 1A) and 100' (FIG. 1B) in which two incumbent microwave devices, 102-1 and 102-2, are communicating via corresponding point-to-point (p2p) microwave links involving microwave transmissions in the 6 GHz band. For example, incumbent microwave device 102-1 can communicate with incumbent microwave device 102-2 via a first microwave link 104-1 operated at a first frequency in the 6 GHz band, shown in FIGS. 1A and 1B as 'f1'. Further, incumbent microwave device 102-2 can communicate with incumbent microwave device 102-1 via a second microwave link 104-2 operated at a second frequency in the 6 GHz band, shown in FIGS. 1A and 1B as 'f2'.

Further consider that a wireless AP 106 is present in outdoor environments 100/100' and is operated within a geographic proximity of the incumbent microwave devices 102-1 and 102-2. Further consider that wireless AP 106 is configured with a software-defined antenna that can be configured to provide an RF transmission beam that can be steered through a variety of beam patterns, configurations, or modes, including, but not limited to, a wide beam mode, a narrow beam mode, or a narrow beam mode having a vertical orientation (e.g., tilt angle) of a number of degrees from a center or boresight orientation (0=) 0° relative to a horizon or center of the software-defined antenna (e.g., 10°, 20°, or any other angle from center that may be facilitated via software steering capabilities provided for the AP 106).

As shown in the outdoor environment 100 of FIG. 1A, when wireless AP 106 is operated in the wide beam mode, a wide transmission beam 107 transmitted/radiated by the wireless AP 106 interferes/impacts the first and second microwave links 104-1/104-2 of incumbent microwave devices 102-1/102-2. However, as shown in the outdoor environment 100' of FIG. 1B, when wireless AP 106 is operated in the narrow beam mode, a narrow transmission beam 108 transmitted/radiated by the wireless AP 106 does not interfere or impact the first and second microwave links 104-1/104-2 of incumbent microwave devices 102-1/102-2.

Thus, as illustrated in FIGS. 1A and 1B, it is desirable to manage beam configurations for a wireless AP having a software-defined antenna in order to limit interference for incumbent wireless devices operated within a geographic proximity to the wireless AP. In particular, it would be advantageous for a control or management service for an outdoor WLAN, such as an AFC service, to know the antenna/beam direction (also referred to herein interchangeably as 'orientation'), beam width (also sometimes referred to as 'beamwidth'), and transmission power (e.g., EIRP) for one or more beams of the wireless AP capable of operation via one or more software-defined antennas of the wireless AP.

Knowing such antenna/beam information for a wireless AP can greatly impact how much energy the wireless AP may use in a particular direction without causing interference to incumbent wireless devices within proximity to the wireless AP. In some instances, for example, software-defined antenna beams can play a significant role in an AFC process performed by an AFC service, which can reject or allow a grant or allow certain frequencies in the U-NII 5 or 7 bands that may not impact nearby incumbents. Without knowledge of antenna/beam information that can be provided by a wireless AP, the AFC process performed by the AFC service could simply reject a grant even though the antenna of the wireless AP may be pointing in an opposite direction from incumbents and, thus, would not impact the incumbents.

In accordance with embodiments herein, techniques are provided through which a wireless AP can communicate to a control or management service, such as an AFC service, a request to operate a transmission beam to be produced by the wireless AP using a transmitter and a software-defined antenna of the wireless AP. In response to the request, the wireless AP can obtain beam configuration information from the management service that identifies one or more parameters that the wireless AP is to utilize for operation of the transmission beam to be produced by the wireless AP using the transmitter and the software-defined antenna.

Figure 2A:
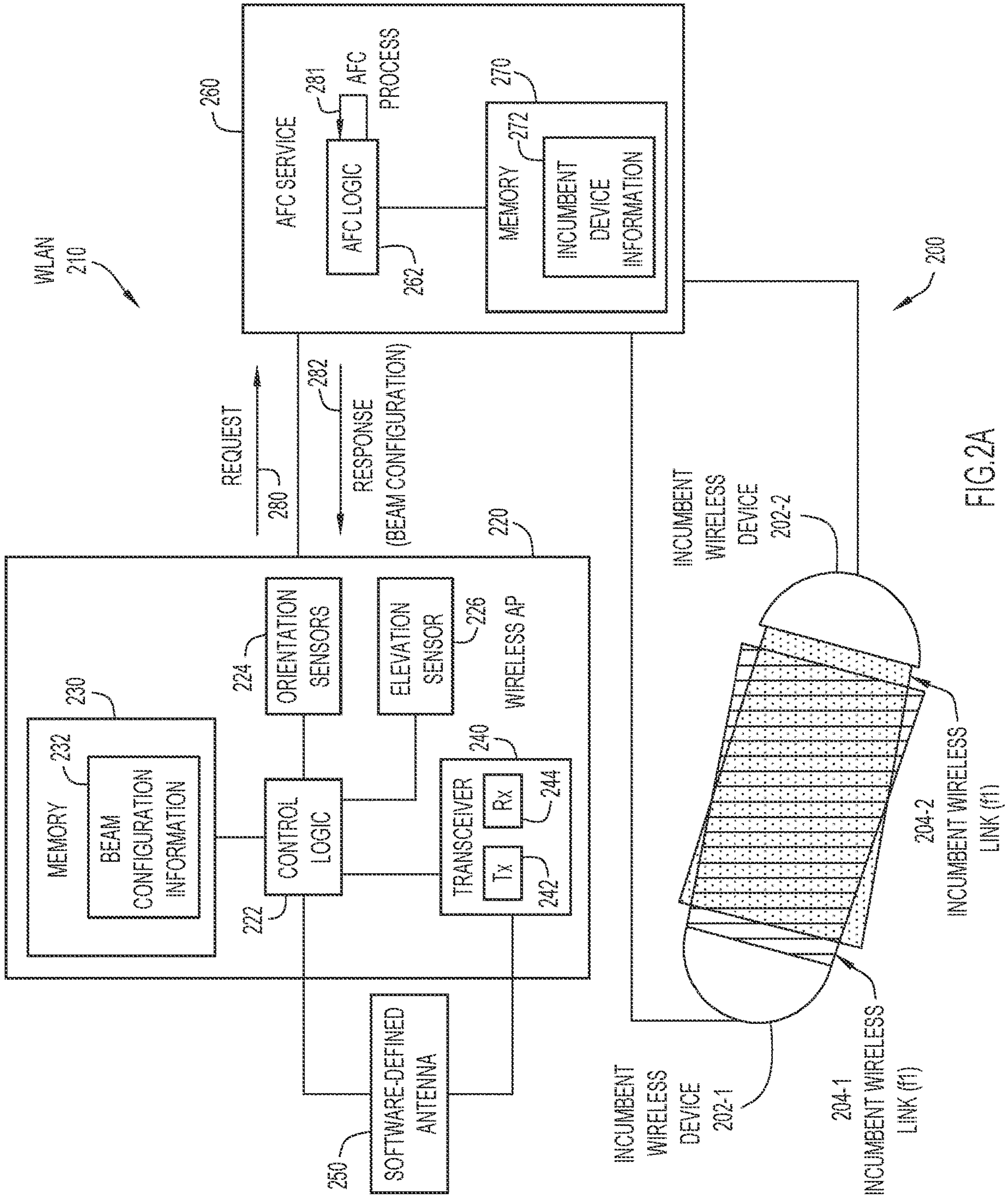
FIG. 2A is a block diagram of a system that may be implemented to facilitate software-defined antenna management for a wireless an access point (AP) of a wireless local area network (WLAN), according to an example embodiment.
Figure 2B:
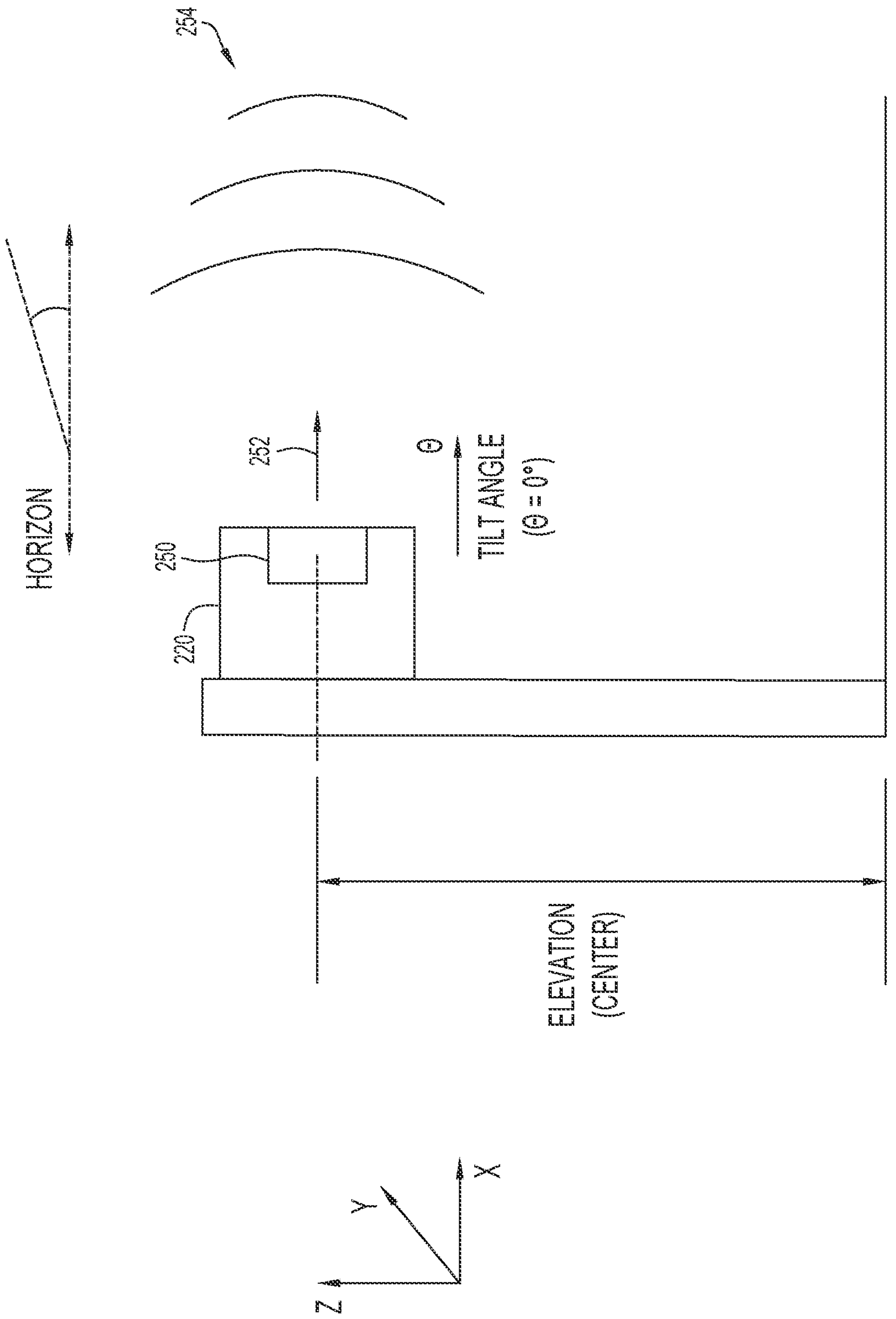
FIG. 2B illustrates details associated with vertical orientations that can be provided by the software-defined antenna of the wireless AP of FIG. 2A, according to an example embodiment.

Through embodiments herein, current and/or future Wi-Fi standards (e.g., Wi-Fi 6, Wi-Fi 7, IEEE 802.11bn (Wi-Fi 8), and/or any other future Wi-Fi standards) can be improved/enhanced to enable an exchange of information between wireless APs operating software-defined antennas (sometimes referred to as 'smart' antennas) and a control or management service, such as an AFC service, in which the control service can provide beam configuration to the wireless APs in order to steer/switch beams operated by the wireless APs via software-defined antennas to different positions/orientations, modes, power levels, and/or frequencies Referring to FIG. 2A, FIG. 2A is a block diagram of a system 200 that may be implemented to facilitate management of a software-defined antenna for a wireless AP of a WLAN, according to an example embodiment. FIG. 2B illustrates details associated with orientations of the software-defined antenna of the wireless AP of FIG. 2A that can be managed for one or more transmission beams transmitted or radiated by the wireless AP, according to an example embodiment, and is discussed with reference to FIG. 2A.

In at least one embodiment, system 200 may include a WLAN 210 that includes a wireless AP 220 and an automated frequency coordination (AFC) service 260 in which the wireless AP 220 and the AFC service 260 may interface with each other. In at least one embodiment, wireless AP 220 may include control logic 222, orientation sensors 224, an elevation sensor 226, a memory 230, and a transceiver 240 that may include a transmitter (Tx) 242 and a receiver (Rx) 244. The wireless AP 220 may also include a software-defined antenna 250 (also referred to herein as a software-defined antenna assembly or simply an antenna). As shown in FIG. 2A, the control logic 222 may interface with the orientation sensors 224, the elevation sensor 226, the memory 230, the transceiver 240, and the software-defined antenna 250. The transceiver 240 may also interface with the software-defined antenna 250.

AFC service 260 may include AFC logic 262 that interfaces with a memory 270 that can store incumbent device information 272 for one or more incumbent wireless devices that may be present within system 200. For example, as shown in FIG. 2A are incumbent wireless devices that can be present/located within a geographic proximity of WLAN 210/wireless AP 220, such as an incumbent wireless device 202-1 and an incumbent wireless device 202-2. As illustrated in FIG. 2A, incumbent wireless device 202-1 can communicate with incumbent wireless device 202-2 via an incumbent wireless link 204-1 operating at a first 6 GHz frequency, shown in FIG. 2A as 'f1', and incumbent wireless device 202-2 can communicate with incumbent wireless device 202-1 via an incumbent wireless link 204-2 operated at a second 6 GHz frequency, shown in FIG. 2A as 'f2'. In some example embodiments, incumbent wireless devices 202-1 and 202-2 may interface with AFC service 260. In some example embodiments, wireless AP 220 and incumbent wireless devices 202-2 and 202-1 may be provided in an outdoor environment (e.g., a parking lot, field, stadium, etc.).

The incumbent device information 272 stored via memory 270 may identify a geographic location for each of incumbent wireless devices 202-1 and 202-2, such as vertical orientation of the devices (e.g., tilt angle), horizontal orientation of the devices (e.g., intercardinal/ordinal direction or angle of rotation (azimuth) over a horizontal plane relative to the horizon), transmission power of the devices, operating frequency or frequencies of the devices, and/or any other information that may be used to facilitate management of software-defined antennas for wireless APs (e.g., wireless AP 220) in an environment. In various embodiments, the incumbent device information 272 can be configured for memory 270 by a network administrator, via an exchange with incumbent wireless devices 202-1 and 202-2, via an exchange with a network controller, and/or using any other techniques as may be understood by a person having ordinary skill in the art.

Control logic 222 of wireless AP 220 can operate to perform functions associated with various operations discussed for embodiments herein and may store, maintain, or otherwise interact with information stored via memory 230 in order to facilitate operations for wireless AP 220 in accordance with embodiments herein.

Broadly, during operation of system 200, wireless AP 220 can initiate a request (as generally shown at 280) towards AFC service 260 for operation of a transmission beam to be produced by the wireless AP 220 within system 200. The AFC service 260, via AFC logic 262, can perform an AFC process (as generally shown at 281), based on the request and the incumbent device information 272 in order to determine beam configuration information that can be sent to the wireless AP 220 (as generally shown at 282) in which the beam configuration information (shown in FIG. 2A as beam configuration information 232) is stored via memory 230 and used by the wireless AP 220 for configuration and operation of the transmission beam that is produced using the transmitter 242 and the software-defined antenna 250 in accordance with the beam configuration information 232. Stated differently, the wireless AP 220, via control logic 222 and orientation sensors 224, can operate to configure at least one of the transmitter 242 and the software-defined antenna 250 to produce (transmit/radiate) the transmission beam by the wireless AP 220 in accordance with the beam configuration information 232. Additional details regarding the AFC process (281) performed by the AFC service 260 are discussed in further detail herein. Generally, the AFC process performed by the AFC service 260 can operate to maximize spectrum availability for license-exempt devices (e.g., WLAN/Wi-Fi devices) through dynamic determination of channel availability at one or more locations in which the AFC process seeks to avoid/protect licensed operations in the 6 GHz frequency band (e.g., to avoid interfering with incumbent wireless device 202-1/202-2 communications).

Thus, the beam configuration information 232 may identify parameters that the wireless AP 220 is to utilize to configure the transmitter 242 and/or the software-defined antenna 250 for one or more transmission beams to be produced by the wireless AP 220. In various embodiments, the parameters identified in the beam configuration information 232 can identify any combination of inclusionary parameters that may be considered particular parameters that are to be/can be utilized/configured for the transmitter 242 and/or the software-defined antenna 250) and/or exclusionary parameters that may be considered particular parameters that cannot be utilized/configured for the transmitter 242 and/or the software-defined antenna 250 (e.g., parameters/settings that are not to be used/are to be excluded from use by the wireless AP 220).

Regarding operation of the wireless AP 220, the orientation sensors 224 are configured to determine a vertical orientation (e.g., tilt angle, referred to herein as 'e') and a horizontal orientation (e.g., intercardinal/ordinal direction or angle of rotation (azimuth) over a horizontal plane relative to the horizon) of the software-defined antenna 250. The control logic 222 is configured to estimate orientation information (vertical orientation and horizontal orientation) for the software-defined antenna using output from the orientation sensors 224. The elevation sensor 226 is configured to measure an elevation (e.g., height above the ground/floor) of the wireless AP 220 (or software-defined antenna 250) and the control logic is configured to determine an elevation of the wireless AP 220/software-defined antenna 250 based on elevation output by the elevation sensor 226.

The control logic 222 may further use orientation information from the orientation sensors 224 in order to control or manage the orientation of the software-defined antenna 250 based on the beam configuration information 232 obtained from the AFC service 260 for one or more transmission beams that the wireless AP 220 requests to operate. In at least one embodiment, the beam configuration may identify a vertical orientation (tilt angle) that the wireless AP 220, via control logic 222, is to utilize to control or manage (e.g., steer) the tilt angle of software-defined antenna 250. In at least one embodiment, the beam configuration may identify, in addition to and/or in lieu of a vertical orientation, a horizontal orientation (azimuth) that wireless AP 220, via control logic 222, is to utilize to control or manage (e.g., steer) the horizontal direction/azimuth towards which the software-defined antenna 250 is pointed/directed. In accordance with embodiments herein, that software-defined antenna 250 may include, be configured with, and/or be controlled via any combination of motors, actuators, and/or any other control assembly/assemblies (not shown) that may facilitate controlling, managing and/or otherwise managing steering any combination of vertical orientation (tilt angle) and/or horizontal orientation (azimuth) of the software-defined antenna 250 via control logic 222, beam configuration information 232, and outputs from orientation sensors 224. The control logic 222 is further configured to generate a beam transmission control to control or manage output power and transmission frequency of transmitter 242 for one or more transmission beams produced by the wireless AP based on the beam configuration information 232 obtained from the AFC service 260.

In some example embodiments, the control logic 222 is configured to estimate an angle of tilt of the software-defined antenna 250 relative to the horizon or a center elevation of the software-defined antenna 250 based on the orientation determined by the orientation sensors 224. In example embodiments, orientation sensors 224 may be implemented as a three-dimensional (XYZ) accelerometer that can detect the vertical orientation (tilt) of a device, such as software-defined antenna 250, and a magnetometer that can detect the horizontal orientation or direction (intercardinal/ordinal direction or angle of rotation (azimuth) over a horizontal plane relative to the horizon) towards which the software-defined antenna is pointed/directed (e.g., for a particular beam to be transmitted by the wireless AP 220). Even if an object, such as software-defined antenna 250, is not moving, the accelerometer can measure acceleration due to Earth's gravity, which is a constant downward force acting on all objects. Thus, the accelerometer can determine if the object is parallel to the Earth's surface or if it is tilted and, more specifically, can measure the tilt (in degrees).

Further regarding the orientation sensors 224, the magnetometer can measure the direction towards which the software-defined antenna 250 is directed/pointed by measuring the Earth's magnetic field or magnetic moment.

Other sensors may be implemented for the orientation sensors 224 to measure vertical and/or horizontal orientations of the software-defined antenna, such as a gyroscope, an inertial measurement unit (IMU), or other similar sensors (now known or hereinafter developed).

Figure 2C:
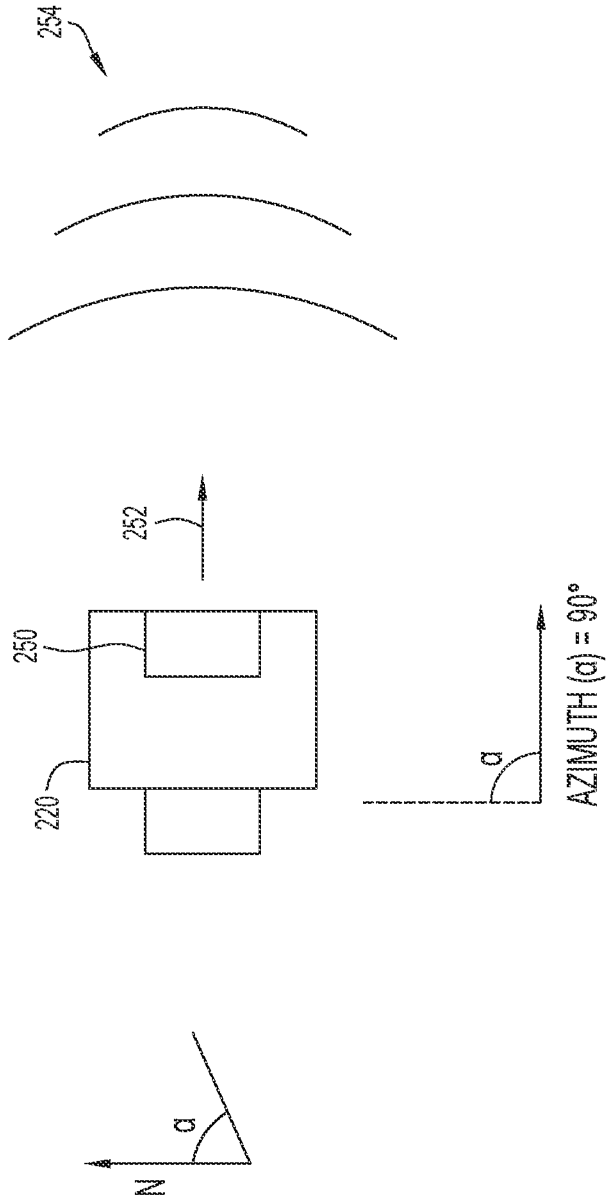
FIG. 2C illustrates details associated with horizontal orientations that can be provided by the software-defined antenna of the wireless AP of FIG. 2A, according to an example embodiment.

Referring briefly to FIGS. 2B and 2C, FIG. 2B illustrates details associated with vertical orientations (tilt angles) that can be provided by the software-defined antenna 250 of the wireless AP 220 for one or more transmission beams radiated or transmitted by the wireless AP 220, according to an example embodiment, and FIG. 2C illustrates details associated with horizontal orientations (direction/azimuth) that can be provided by the software-defined antenna 250 of the wireless AP of FIG. 2A for one or more transmission beams radiated or transmitted by the wireless AP 220, according to an example embodiment.

As shown in FIG. 2B, which is a side view representation of the wireless AP 220/software-defined antenna 250, the software-defined antenna 250 may be controlled (by control logic 222) in at least one instance to transmit or radiate a signal or transmission beam 252 having a beam width 254 (also sometimes referred to as transmit/radiation pattern) in a vertical direction in relation to the horizon. As also, shown in FIG. 2B, the software-defined antenna 250 may have an elevation, relative to a center of the software-defined antenna, which can be measured by elevation sensor 226 (not shown). In the example of FIG. 2B, the software-defined antenna 250 is controlled to transmit/radiate the transmission beam 252 in a vertical orientation (tilt angle, 0) of 0° relative to the horizon or the center elevation of the software-defined antenna 250, which is assumed to be parallel with the horizon. In accordance with embodiments herein, the vertical orientation (tilt angle) of the software-defined antenna can be controlled, via beam configuration information provided by AFC service 260, to be set to a particular vertical orientation or tilt angle in which the tilt angle may be prescribed as a downward tilt angle relative to center (e.g., 10° downward from center, 20° downward from center, etc.). In some embodiments, a tilt angles can also be prescribed using upward tilt angles.

As shown in FIG. 2C, which is a top-down view representation of the wireless AP 220/software-defined antenna 250, the software-defined antenna 250 may have a horizontal orientation such that the transmission beam 252 can be transmitted in a particular direction for a horizontal angle, or azimuth, represented as 'a', relative to the cardinal North direction. In the example of FIG. 2C, the software-defined antenna 250 is directed to transmit the transmission beam 252 for a horizontal orientation of 90° relative to the cardinal North direction. Other horizontal orientations for the software-defined antenna 250 can be envisioned. In some embodiments herein, the vertical orientation of software-defined antenna can be controlled, via beam configuration information provided by AFC service 260, to be set to a particular horizontal orientation/direction or azimuth in which the azimuth may be prescribed as a negative/left/counterclockwise or positive/right/clockwise rotation relative to 0° or the cardinal North direction (e.g., −30° or 30° left/counterclockwise of 0°/North, 35° or 35° right/clockwise of 0°/North, etc.).

Returning to FIG. 2A, the request/response (280/282) exchange between wireless AP 220 and the AFC service 260 can be performed in various forms and can encompass various AFC processes. It is noted that conventional AFC processes may not consider vertical/horizontal orientations (tilt/azimuth) for an antenna, however, embodiments herein envision that contention for the 6 GHz band may increase over time such that future AFC processes under future standards may consider any combination of vertical (tilt angle) and/or horizontal (azimuth) antenna information.

As noted above, during operation of system 200, the wireless AP 220 (or a proxy thereof) may initiate a request towards the AFC service 260 for a grant to operate a transmission beam (also referred to interchangeably herein as a 'beam request') to which the AFC service 260 can provide a response (also referred to interchangeably herein as a 'beam response'), following an AFC process performed via AFC logic 262, which may consider at least the elevation, horizontal orientation (azimuth), and/or beam switching of the software-defined antenna 250, as well as the incumbent device information 272 in the AFC process. For the AFC process, the AFC logic 262 can, for example, determine whether there will be any potential impacts to incumbent wireless links 204-1 and 204-2 for one or more different potential configurations of a beam to be operated via the software-defined antenna 250 (e.g., wide, narrow, etc.).

In various embodiments, the request sent by the wireless AP 220 and the response provided by the AFC service 260 could be facilitated through an exchange involving spectrum inquiry request/response message or through a new request Information Element (IE) or message and a new response IE or message. In at least one embodiment, request/response IEs/messages may be provided as Vendor Specific Extension IEs/messages. In at least one embodiment, the request/response IEs/messages may be provided as standards-defined IEs/messages.

Different requests (beam requests) can be sent by the wireless AP 220 in accordance with embodiments herein. In some embodiments, a request sent by the wireless AP 220 may be a request for multiple grants involving multiple beams to be operated by the wireless AP 220.

In some example embodiments, the wireless AP 220 may send the AFC service 260 a request that identifies the elevation of the software-defined antenna 250 and the horizontal orientation (azimuth) for the direction that the software-defined antenna 250 is pointed/directed. In such embodiments, the AFC service 260/AFC logic 262 can perform an AFC process using a coordination algorithm that considers at least the elevation and horizontal orientation (azimuth) of the software-defined antenna 250 and the incumbent device information in order to provide a response to the wireless AP 220 including beam configuration information 232. The beam configuration information 232 may identify any combination of a beam width, a vertical orientation (tilt angle), a transmission power (EIRP level), and/or a transmission frequency that the wireless AP 220, via control logic 222, is to use to configure any combination of the software-defined antenna 250 and/or the transmitter 242 to produce (e.g., transmit/radiate) a transmission beam or beam(s) (which may or may not be the transmission beam(s) requested by the wireless AP 220, for example, if the transmission beam(s) requested by the wireless AP 220 is/are not allowed or is/are adjusted in some manner/characteristic by the AFC process).

In various embodiments, beam configuration information 232 sent to the wireless AP 220 can be identified using enumerated values, flags, Attribute-Value Pairs (AVPs), and/or any other mechanism through which beam configuration information 232 (e.g., wide transmission beam, narrow transmission beam, narrow with angle 10°, narrow with angle 20°, potentially horizontal orientation/azimuth, EIRP level or value, frequency, etc.) can be identified and used by the wireless AP 220 to configure any combination of the software-defined antenna 250 and/or the transmitter to operate (e.g., transmit/radiate) a transmission beam.

Other request/response exchanges can be envisioned in accordance with embodiments herein. In some example embodiments, the wireless AP 220 may send the AFC service 260 a request for a grant for a particular beam configuration (or multiple particular beam configurations) in which the request identifies the elevation and horizontal orientation of the software-defined antenna 250 and identifies a requested beam configuration (or multiple configurations) that may identify any combination of beam width, orientation (vertical and/or horizontal), transmission power, and/or transmission frequency for the transmission beam(s) that the wireless AP 220 seeks to transmit/radiate.

In some example embodiments, the wireless AP 220 may send the AFC service 260 a request for a grant in which the request identifies the elevation and horizontal orientation of the software-defined antenna 250 and further includes beam capability information that identifies transmission capabilities of the wireless AP 220. In various embodiments, the beam capability information may identify any combination of a range of beam widths supported by the wireless AP 220, a range of vertical orientations (tilt angles) supported by the wireless AP 220, a range of horizontal orientations (azimuths) supported by the wireless AP 220, a range of transmission powers supported/capable by the wireless AP 220, and/or a range of transmission frequencies supported/capable by the wireless AP 220.

Thus, in accordance with embodiments herein, a request sent by the wireless AP 220 to the AFC service 260 (or any control or management service) may include at least one of: an elevation of the software-defined antenna 250 of the wireless AP 220; beam width information indicating at least one beam width (or beam width mode) for the transmission beam (or beams) that the wireless AP 220 requests to operate or is capable of operating; orientation information indicating at least one of a vertical orientation (tilt angle) and/or a horizontal orientation (azimuth) of the software-defined antenna 250 for the transmission beam (or beams) that the wireless AP 220 requests to operate or is capable of operating; frequency information indicating at least one transmission frequency for the transmission beam (or beams) that the wireless AP 220 requests to operate or is capable of operating; and/or power information indicating at least one transmission power for the transmission beam (or beams) that the wireless AP 220 requests to operate or is capable of operating.

Different responses (beam responses) including different beam configuration information 282 can be sent by the AFC service 260 in accordance with embodiments herein, based on different information included in a request received from the wireless AP 220 and/or based on different AFC processes/algorithms that may be performed via the AFC logic 262.

Consider various AFC processes that may be performed by the AFC service 260/AFC logic 262. In some instances, for example, the AFC logic 262 may determine that if the wireless AP 220/software-defined antenna 250 were to be operated as a wide transmission beam, there could be a possible impact to incumbent wireless devices 202-1 and 202-2 in the frequencies f1 and f2 where f1, f2 belong to U-NII 5 and 7 bands. In such instances, the AFC logic 262 may only assign grants to the wireless AP 220 to operate the software-defined antenna 250 for frequencies excluding f1 and f2.

Thus, in some instances, the AFC service 260 may provide a response to wireless AP 220 that includes beam configuration information that identifies transmission frequencies for beams that the wireless AP 220 may not operate within or that are to be excluded from operation by the wireless AP 220. Accordingly, in some example embodiments, the beam configuration information 232 sent to wireless AP 220 may identify exclusionary parameters, such as excluded beam width(s), tilt angle(s), azimuth(s), transmission power(s), and transmission frequencies, that the wireless AP 220 is not allowed to utilize for one or more beam transmissions.

In some instances, AFC logic 262 may perform a more aggressive AFC process and determine that the wireless AP 220 may use f1 and f2, but at lower power (EIRP) levels. In such instances, the beam configuration information 232 sent to the wireless AP 220 can identify the transmission frequencies and the transmission powers that the wireless AP 220 is to use to configure transmitter 242 for operation of one or more beams.

In still some instances, the AFC logic 262 may determine that the wireless AP 220 may be allowed to operate a narrow transmission beam at all U-NII 5 and 7 bands, which information (potentially including vertical and/or horizontal orientation information, transmission frequencies, and/or powers, etc.) can be identified via beam configuration information 232 sent to the wireless AP 220. In still some instances, such bands may be excluded from operation at certain frequencies, or the wireless AP 220 may be allowed to operate within them at higher EIRP levels for a wide beam mode.

In still some instances, the AFC logic 262 may determine that a wide transmission beam is to be used at certain sites/locations based on potential impacts to incumbents. In still some instances, a wide transmission beam may be used at lower EIRP levels.

Thus, based on different configurations of the wireless AP (e.g., elevation, vertical/horizontal orientation, etc.), spectrum grants of frequency, EIRP may vary for different AFC processes that may be performed by the AFC service 260/AFC logic 262 such that beam configuration information

232 can be included in a response (or responses) for each one or more transmission beams that the wireless AP 220 may seek to operate.

In accordance with embodiments herein, parameters of beam configuration information 232 sent to wireless AP 220 may identify one or more of: a beam width (or multiple beam widths) that the wireless AP 220 is to utilize (e.g., inclusionary parameters) or is not to utilize (e.g., exclusionary parameters) to configure the software-defined antenna 250 to operate/produce a transmission beam (or multiple beams); orientation information (vertical and/or horizontal) that the wireless AP 220 is to utilize or is not to utilize to configure the software-defined antenna 250 to operate/produce a transmission beam (or beams); at least one transmission frequency that the wireless AP 220 is to utilize or is not to utilize to configure the transmitter 242 to operate/produce the transmission beam (or beams); and/or at least one transmission power that the wireless AP 220 is to utilize or is not to utilize to configure the transmitter 242 to operate/produce the transmission beam (or beams). Thus, the wireless AP 220 may configure at least one of the transmitter 242 and/or the software-defined antenna 250 based on the parameters of the beam configuration information 232 and may operate/produce the transmission beam (or beams) by performing beam transmissions via the transmitter and the software-defined antenna.

Accordingly, embodiments herein may enhance the ability of the wireless AP 220/control logic 222 to determine whether to use different beam widths and/or EIRP levels for different scenarios (e.g., wide transmission beam with lower EIRP levels or narrow transmission beam with higher EIRP levels), to use different vertical orientations (tilt angles) and/or horizontal orientations (azimuths) for different scenarios (e.g., that may provide a balance between beam width and EIRP levels), and/or the like.

Figure 3:
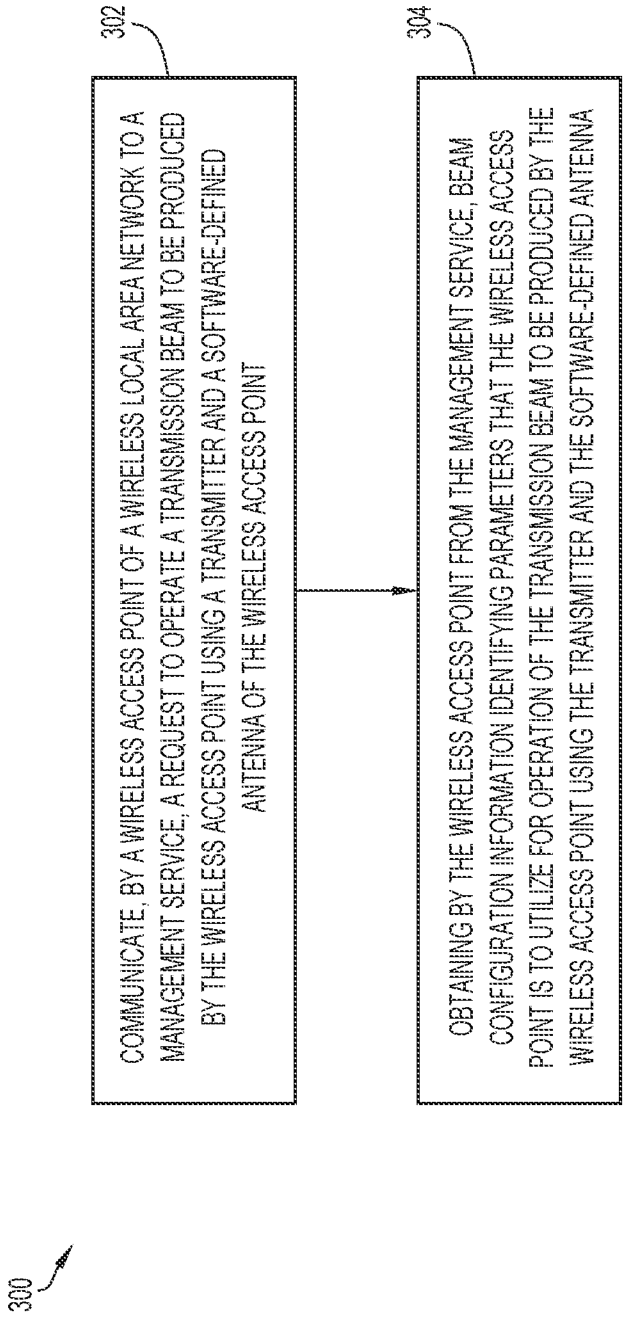
FIG. 3 is a flow chart depicting a method according to an example embodiment.

Referring to FIG. 3, FIG. 3 is a flow chart depicting a method 300, according to an example embodiment. In at least one embodiment, method 300 illustrates operations that may be performed by at least one of a wireless AP, such as the wireless AP 220 as shown in FIG. 2A, and a control or management service, such as the AFC service 260 as shown in FIG. 2A, in order to facilitate software-defined antenna management for the wireless AP according to an example embodiment.

At 302, the method may include communicating, by a wireless access point of a wireless local area network to a management service, a request to operate a transmission beam to be produced by the wireless access point using a transmitter and a software-defined antenna of the wireless access point. At 304, the method may include obtaining by the wireless access point from the management service, beam configuration information identifying parameters that the wireless access point is to utilize for operation of the transmission beam to be produced by the wireless access point using the transmitter and the software-defined antenna.

Figure 4:
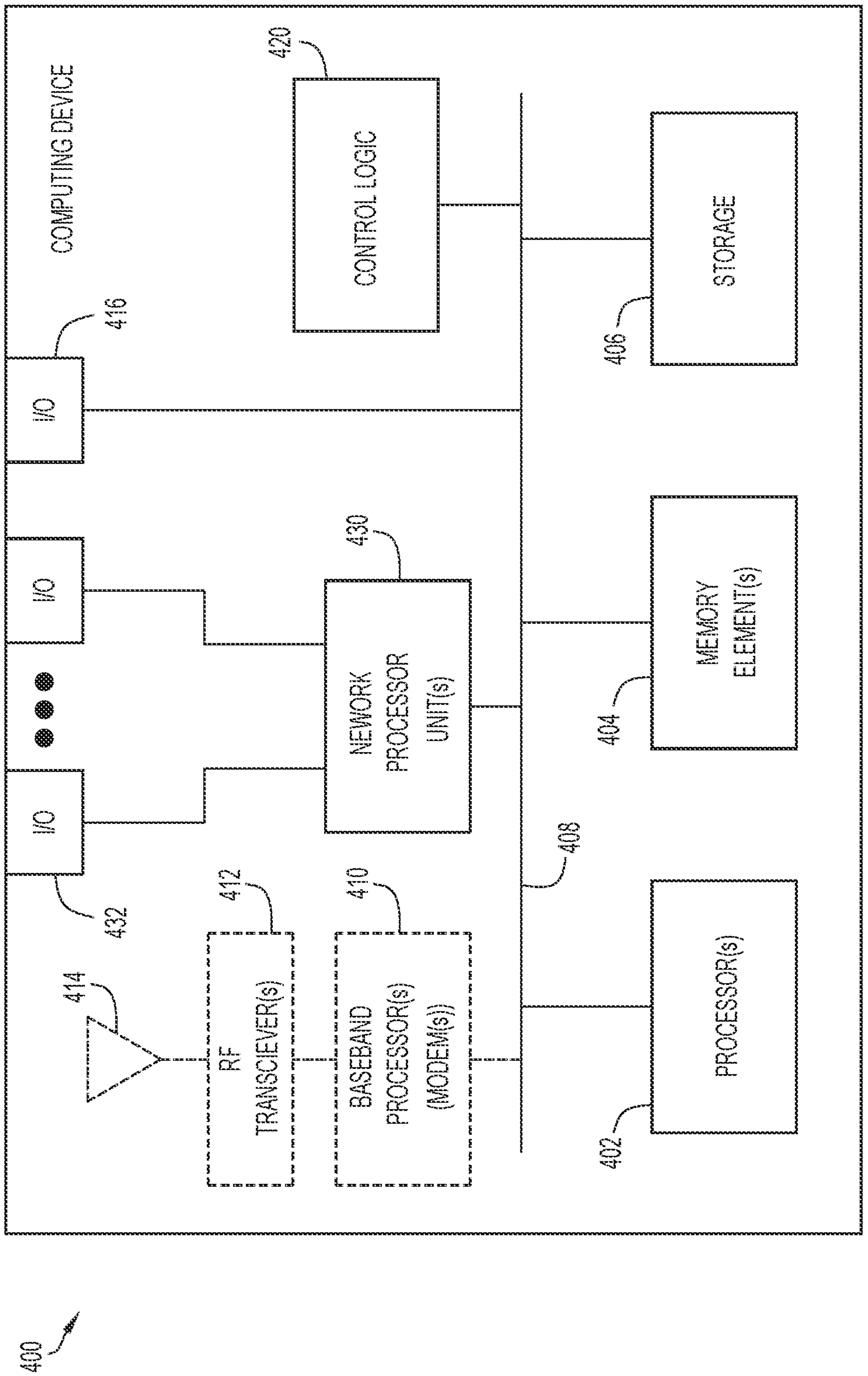
FIG. 4 illustrates a hardware block diagram of a computing device configured to perform functions associated with operations discussed in connection with embodiments herein.

Referring to FIG. 4, FIG. 4 illustrates a hardware block diagram of a computing device 400 that may perform functions associated with operations discussed herein in connection with the techniques described for embodiments herein. In various embodiments, a computing device or apparatus, such as computing device 400 or any combination of computing devices 400, may be configured as any entity/entities in order to perform operations of the various techniques discussed for embodiments herein, such as any elements, functions, etc. discussed for embodiments herein (e.g., wireless AP 220, AFC service 260, etc.).

In at least one embodiment, the computing device 400 may be any apparatus that may include one or more processor(s) 402, one or more memory element(s) 404, storage 406, a bus 408, one or more network processor unit(s) 430 interconnected with one or more network input/output (I/O) interface(s) 432, one or more I/O interface(s) 416, and control logic 420. In various embodiments, instructions associated with logic for computing device 400 can overlap in any manner and are not limited to the specific allocation of instructions and/or operations described herein.

For embodiments in which computing device 400 may be implemented as any device capable of wireless communications, computing device 400 may further include at least one baseband processor or modem 410, one or more radio RF transceiver(s) 412 (e.g., any combination of RF receiver(s) and RF transmitter(s)), one or more antenna(s) or antenna array(s) 414 (which may be inclusive of software-defined antenna(s) or antenna array(s) in accordance with embodiments herein.

In at least one embodiment, processor(s) 402 is/are at least one hardware processor configured to execute various tasks, operations, and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 430 may enable communication between computing device 400 and other systems, entities, etc., via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that may be connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 400 is implemented as a wireless device or any apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include communicating, by a wireless access point of a wireless local area network to a management service, a request to operate a transmission beam to be produced by the wireless access point using a transmitter and a software-defined antenna of the wireless access point; and obtaining, by the wireless access point from the management service, beam configuration information identifying parameters that the wireless access point is to utilize for operation of the transmission beam to be produced by the wireless access point using the transmitter and the software-defined antenna. In a least one instance, the transmission beam is operated at a transmission frequency in a 6 Gigahertz (GHz) band.

In at least one instance, the parameters of the beam configuration information identify one or more of: a beam width that the wireless access point is to utilize or is not to utilize to configure the software-defined antenna to operate the transmission beam; orientation information that the wireless access point is to utilize or is not to utilize to configure the software-defined antenna to operate the transmission beam; at least one transmission frequency that the wireless access point is to utilize or is not to utilize to configure the transmitter to operate the transmission beam; or at least one transmission power that the wireless access point is to utilize or is not to utilize to configure the transmitter to operate the transmission beam. In at least one instance, the beam width identifies a wide transmission beam width or a narrow transmission beam width that the wireless access point is to utilize or is not to utilize to configure the software-defined antenna to operate the transmission beam.

In at least one instance, the orientation information indicates at least one of a horizontal orientation that the wireless access point is to utilize or is not to utilize to configure the software-defined antenna to operate the transmission beam; or a vertical orientation that the wireless access point is to utilize or is not to utilize to configure the software-defined antenna to operate the transmission beam. In at least one instance, the at least one transmission frequency is at least one frequency within a 6 Gigahertz (GHz) frequency band that the wireless access point is to utilize or is not to utilize to configure the transmitter to operate the transmission beam. In at least one instance, the at least one transmission power is at least one Equivalent Isotropic Radiated Power (EIRP) level that the wireless access point is to utilize or is not to utilize to configure the transmitter to operate the transmission beam.

In at least one instance, the method may further include configuring at least one of the transmitter or the software-defined antenna based on the parameters of the beam configuration information; and operating the transmission beam by performing transmissions via the transmitter and the software-defined antenna.

In at least one instance, the beam configuration information is provided to the wireless access point based on one or more incumbent wireless transmission devices operating within a geographic proximity of the wireless access point. In at least one instance, the beam configuration information is provided to the wireless access point for an automated frequency coordination (AFC) process provided by the management service.

In at least one instance, the request includes at least one of: an elevation of the software-defined antenna of the wireless access point; beam width information indicating at least one width for the transmission beam that the wireless access point requests to operate or that the wireless access point is capable of operating; orientation information indicating at least one of a vertical orientation or a horizontal orientation of the software-defined antenna for the transmission beam that the wireless access point requests to operate or that the wireless access point is capable of operating; frequency information indicating at least one transmission frequency for the transmission beam that the wireless access point requests to operate or that the wireless access point is capable of operating; or power information indicating at least one transmission power for the transmission beam that the wireless access point requests to operate or that the wireless access point is capable of operating.

Accordingly, embodiments herein may broadly provide for the ability for a wireless AP to communicate the direction of its software-defined antenna (or antennas), its beamwidth, and/or any other information related to the operation of one or more transmission beams produced or to be produced by the wireless AP (e.g., elevation, frequency, power, etc.) to a control or management service such as AFC service. The wireless AP can receive beam configuration information from the control or management service that the wireless AP can use to operate/produce one or more transmission beams using its software-defined antenna (or antennas) in accordance with the received beam configuration information. Thus, enhancements/features discussed for embodiments herein may be incorporated into WLAN standards to introduce new elements that may be used to improve the functionality of directionality of 6 GHz operation for one or more wireless APs for different environments, such as outdoor environments.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, service, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

determining, at a wireless access point of a wireless local area network, an elevation of a software-defined antenna and a horizontal orientation for a direction of the software-defined antenna;

generating, at the wireless access point, a request identifying at least the elevation and the horizontal orientation;

communicating, by the wireless access point of the wireless local area network to a management service, the request to operate a transmission beam to be produced by the wireless access point using a transmitter and the software-defined antenna of the wireless access point; and obtaining by the wireless access point from the management service, beam configuration information identifying parameters that the wireless access point is to utilize for operation of the transmission beam to be produced by the wireless access point using the transmitter and the software-defined antenna.

2. The method of claim 1, wherein the transmission beam is operated at a transmission frequency in a 6 Gigahertz (GHz) band.

3. The method of claim 1, wherein the parameters of the beam configuration information identify one or more of:

a beam width that the wireless access point is to utilize or is not to utilize to configure the software-defined antenna to operate the transmission beam;

orientation information that the wireless access point is to utilize or is not to utilize to configure the software-defined antenna to operate the transmission beam;

at least one transmission frequency that the wireless access point is to utilize or is not to utilize to configure the transmitter to operate the transmission beam; or at least one transmission power that the wireless access point is to utilize or is not to utilize to configure the transmitter to operate the transmission beam.

4. The method of claim 3, wherein the beam width identifies a wide transmission beam width or a narrow transmission beam width that the wireless access point is to utilize or is not to utilize to configure the software-defined antenna to operate the transmission beam.

5. The method of claim 3, wherein the orientation information indicates at least one of:

a horizontal orientation that the wireless access point is to utilize or is not to utilize to configure the software-defined antenna to operate the transmission beam; or a vertical orientation that the wireless access point is to utilize or is not to utilize to configure the software-defined antenna to operate the transmission beam.

6. The method of claim 3, wherein the at least one transmission frequency is at least one frequency within a 6 Gigahertz (GHz) frequency band that the wireless access point is to utilize or is not to utilize to configure the transmitter to operate the transmission beam.

7. The method of claim 3, wherein the at least one transmission power is at least one Equivalent Isotropic Radiated Power (EIRP) level that the wireless access point is to utilize or is not to utilize to configure the transmitter to operate the transmission beam.

8. The method of claim 3, further comprising:

configuring at least one of the transmitter or the software-defined antenna based on the parameters of the beam configuration information; and operating the transmission beam by performing transmissions via the transmitter and the software-defined antenna.

9. The method of claim 1, wherein the beam configuration information is provided to the wireless access point based on one or more incumbent wireless transmission devices operating within a geographic proximity of the wireless access point.

10. The method of claim 9, wherein the beam configuration information is provided to the wireless access point for an automated frequency coordination (AFC) process provided by the management service.

11. The method of claim 1, wherein the request further includes at least one of:

beam width information indicating at least one width for the transmission beam that the wireless access point requests to operate or that the wireless access point is capable of operating;

orientation information for the transmission beam that the wireless access point requests to operate or that the wireless access point is capable of operating;

frequency information indicating at least one transmission frequency for the transmission beam that the wireless access point requests to operate or that the wireless access point is capable of operating; or power information indicating at least one transmission power for the transmission beam that the wireless access point requests to operate or that the wireless access point is capable of operating.

12. One or more non-transitory computer readable storage media encoded with instructions that, when executed by a processor, cause the processor to perform operations, comprising:

determining, at a wireless access point of a wireless local area network, an elevation of a software-defined antenna and a horizontal orientation for a direction of the software-defined antenna;

generating, at the wireless access point, a request identifying at least the elevation and the horizontal orientation;

communicating, by the wireless access point of the wireless local area network to a management service, the request to operate a transmission beam to be produced by the wireless access point using a transmitter and the software-defined antenna of the wireless access point; and obtaining, by the wireless access point from the management service, beam configuration information identifying parameters that the wireless access point is to utilize for operation of the transmission beam to be produced by the wireless access point using the transmitter and the software-defined antenna.

13. The media of claim 12, wherein the parameters of the beam configuration information identify one or more of:

a beam width that the wireless access point is to utilize or is not to utilize to configure the software-defined antenna to operate the transmission beam;

orientation information that the wireless access point is to utilize or is not to utilize to configure the software-defined antenna to operate the transmission beam;

at least one transmission frequency that the wireless access point is to utilize or is not to utilize to configure the transmitter to operate the transmission beam; or at least one transmission power that the wireless access point is to utilize or is not to utilize to configure the transmitter to operate the transmission beam.

14. The media of claim 13, further encoded with instructions that, when executed by a processor, cause the processor to perform further operations, comprising:

configuring at least one of the transmitter or the software-defined antenna based on the parameters of the beam configuration information; and operating the transmission beam by performing transmissions via the transmitter and the software-defined antenna.

15. A wireless access point, comprising:

at least one memory element for storing data; and at least one processor for executing instructions associated with the data, wherein executing the instructions causes the wireless access point to perform operations, comprising:

determining, at the wireless access point of a wireless local area network, an elevation of a software-defined antenna and a horizontal orientation for a direction of the software-defined antenna;

generating, at the wireless access point, a request identifying at least the elevation and the horizontal orientation;

communicating, by the wireless access point to a management service of the wireless local area network, the request to operate a transmission beam to be produced by the wireless access point using a transmitter and the software-defined antenna of the wireless access point; and obtaining, by the wireless access point from the management service, beam configuration information identifying parameters that the wireless access point is to utilize for operation of the transmission beam to be produced by the wireless access point using the transmitter and the software-defined antenna.

16. The wireless access point of claim 15, wherein the parameters of the beam configuration information identify one or more of:

a beam width that the wireless access point is to utilize or is not to utilize to configure the software-defined antenna to operate the transmission beam;

orientation information that the wireless access point is to utilize or is not to utilize to configure the software-defined antenna to operate the transmission beam;

at least one transmission frequency that the wireless access point is to utilize or is not to utilize to configure the transmitter to operate the transmission beam; or at least one transmission power that the wireless access point is to utilize or is not to utilize to configure the transmitter to operate the transmission beam.

17. The wireless access point of claim 16, wherein the beam width identifies a wide transmission beam width or a narrow transmission beam width that the wireless access point is to utilize or is not to utilize to configure the software-defined antenna to operate the transmission beam.

18. The wireless access point of claim 16, wherein the orientation information indicates at least one of:

a horizontal orientation that the wireless access point is to utilize or is not to utilize to configure the software-defined antenna to operate the transmission beam; or a vertical orientation that the wireless access point is to utilize or is not to utilize to configure the software-defined antenna to operate the transmission beam.

19. The wireless access point of claim 16, wherein the at least one transmission frequency is at least one frequency within a 6 Gigahertz (GHz) frequency band that the wireless access point is to utilize or is not to utilize to configure the transmitter to operate the transmission beam.

20. The wireless access point of claim 16, wherein the at least one transmission power is at least one Equivalent Isotropic Radiated Power (EIRP) level that the wireless access point is to utilize or is not to utilize to configure the transmitter to operate the transmission beam.

* * * * *